US011947957B2

(12) United States Patent
Woods et al.

(10) Patent No.: US 11,947,957 B2
(45) Date of Patent: Apr. 2, 2024

(54) GROUPING SOFTWARE APPLICATIONS BASED ON TECHNICAL FACETS

(71) Applicant: VMware LLC, Palo Alto, CA (US)

(72) Inventors: Phillip Steven Woods, Orange Beach, AL (US); Joseph G Szodfridt, Yardley, PA (US); Christopher Michael Umbel, Pittsburgh, PA (US); Shaun Anderson, Golden, CO (US); Rohit Bajaj, Sandy Springs, GA (US)

(73) Assignee: VMware LLC, Palo Alto, CA (US)

( * ) Notice: Subject to any disclaimer, the term of this patent is extended or adjusted under 35 U.S.C. 154(b) by 30 days.

(21) Appl. No.: 17/574,450

(22) Filed: Jan. 12, 2022

(65) Prior Publication Data

US 2023/0221953 A1 Jul. 13, 2023

(51) Int. Cl.
*G06F 9/44* (2018.01)
*G06F 8/30* (2018.01)
*G06F 8/75* (2018.01)
*G06F 18/2137* (2023.01)

(52) U.S. Cl.
CPC .............. *G06F 8/75* (2013.01); *G06F 8/30* (2013.01); *G06F 18/2137* (2023.01)

(58) Field of Classification Search
CPC ........... G06F 8/30; G06F 8/75; G06F 18/2137
USPC .................................................. 717/120–123
See application file for complete search history.

(56) References Cited

U.S. PATENT DOCUMENTS

| | | | | |
|---|---|---|---|---|
| 7,849,090 | B2 * | 12/2010 | Sweeney ................. | G06F 16/84 |
| | | | | 707/741 |
| 9,348,894 | B2 * | 5/2016 | Asadullah ........... | G06F 16/3331 |
| 2022/0028549 | A1 * | 1/2022 | Paulson .................... | G06F 8/38 |

OTHER PUBLICATIONS

Liang et al., "A Software Component Classification Based on Facet and Neural Network", 2008, IEEE, pp. 906-908 pages. (Year: 2008).*
Pandey et al., "Automated Classification of Software Issue Reports Using Machine Learning Techniques: An Empirical Study", 2017, Springer-Verlag, pp. 279-297. (Year: 2017).*

* cited by examiner

*Primary Examiner* — Ted T. Vo
(74) *Attorney, Agent, or Firm* — Quarles & Brady LLP

(57) ABSTRACT

Embodiments of the present disclosure provide to techniques for automatically grouping software applications based on their technical patterns/characteristics (i.e., technical facets) via machine learning (ML) algorithms. For instance, a first set of software applications that exhibit a high prevalence of one or more first technical facets may be grouped into a first category, a second set of software applications that exhibit a high prevalence of one or more second technical facets may be grouped into a second category, and so on. Once grouped into categories, the software applications in a given category may be assessed, analyzed, and/or processed together for various purposes.

21 Claims, 3 Drawing Sheets

GROUPING SOFTWARE APPLICATIONS BASED ON TECHNICAL FACETS

BACKGROUND

Unless otherwise indicated, the subject matter described in this section is not prior art to the claims of the present application and is not admitted as being prior art by inclusion in this section.

Large organizations typically implement hundreds or thousands of software applications of varying complexity and technologies as part of their information technology (IT) infrastructures. In a scenario where such an organization wishes to modernize its IT software portfolio (e.g., move to a container-based platform, decompose existing monolithic systems, rewrite application code in new programming languages, etc.), it is important for the organization to understand the technical composition of the applications in the portfolio in order to make informed decisions regarding evolutionary next steps. Unfortunately, existing approaches for accomplishing this generally require a manual review of each and every software application, which is time consuming, burdensome, and expensive.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for automatically grouping software applications based on their technical patterns/characteristics (referred to herein as technical facets) via machine learning (ML) algorithms. For instance, a first set of software applications that exhibit a high prevalence of one or more first technical facets may be grouped into a first category, a second set of software applications that exhibit a high prevalence of one or more second technical facets may be grouped into a second category, and so on. Examples of these technical facets include the use/import of certain software libraries or packages, the invocation of certain methods/functions, and the inclusion of certain source code annotations, comments, and/or tags.

Once grouped into categories, the software applications in a given category may be assessed, analyzed, and/or processed together for various purposes. For example, in the case of a software portfolio modernization project, the manual review typically carried out for understanding the technical composition of the applications in the portfolio can be implemented at the category, rather than individual application, level. If the software portfolio is large, this can significantly reduce the time, labor, and costs required for completing the review process.

2. Example Computer System and High-Level Workflow

Figure 1:
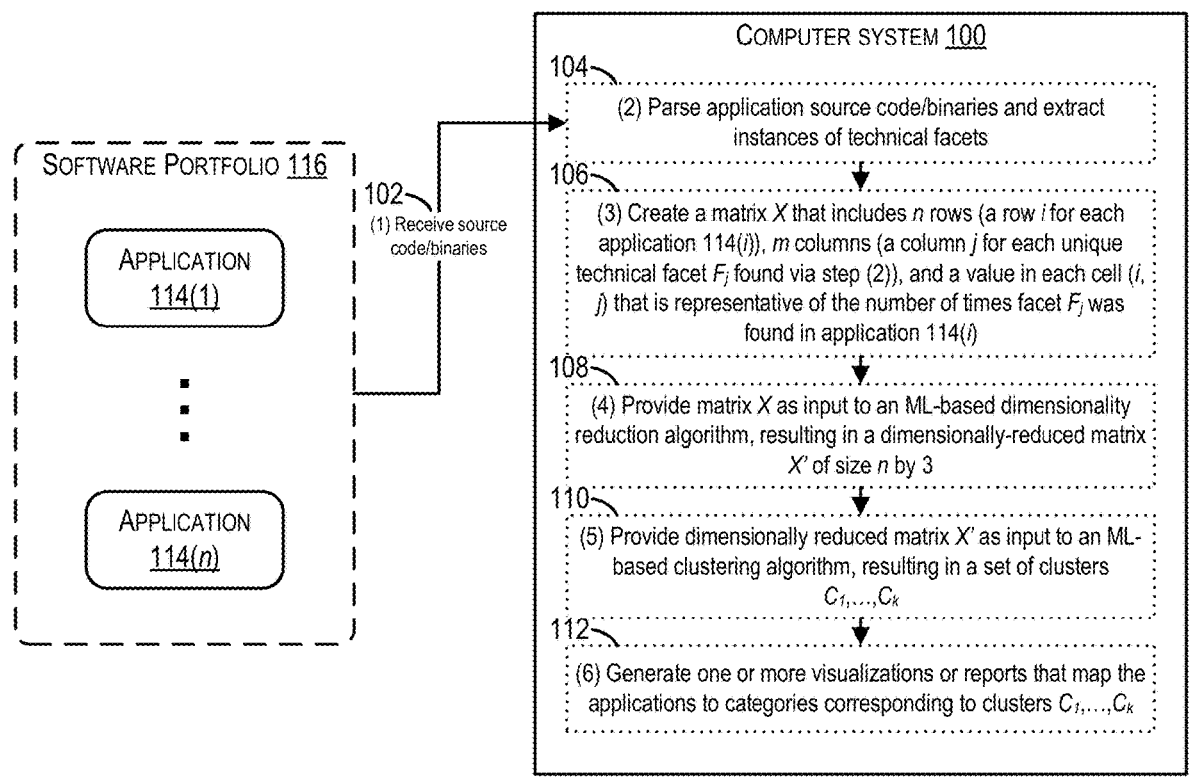
FIG. 1 depicts an example computer system and high-level workflow according to certain embodiments.

FIG. 1 depicts an example computer system 100 and a high-level workflow (comprising steps (1)-(6)/reference numerals 102-112) that may be executed by computer system 100 for automatically grouping a plurality of software applications 114(1)-(n) which are part of a software portfolio 116 in accordance with embodiments of the present disclosure. Software portfolio 116 may comprise any collection of software applications (e.g., of varying size, complexity, technologies, etc.) for which the automated grouping techniques of the present disclosure may be desirable or useful. In one set of embodiments, software portfolio 116 may include the software applications deployed across the IT infrastructure of an organization such as an enterprise, governmental agency, education institution, or the like. In these embodiments, the size of software portfolio (or in other words, the number n) may be in the hundreds, thousands, or higher.

Starting with steps (1) and (2) of the workflow (reference numerals 102 and 104), computer system 100 can receive the source code or binaries (i.e., executable code) for software applications 114(1)-(n), parse the source code/binaries, and extract instances of technical facets (e.g., facets $F_1, \ldots, F_m$) found in the source code/binaries via the parsing. As used herein, a "technical facet" is a technical pattern or characteristic that can be used as a basis/dimension for categorizing a software application. For example, one type of technical facet is an external software library or package that is imported/used by the software application. Another type of technical facet is a method (also known as a function) that is invoked by the software application. Yet another type of technical facet is an annotation, comment, or tag included in or attached to the software application.

At step (3) (reference numeral 106), computer system 100 can create a matrix X based on the technical facet information extracted at step (2) that includes a row i for each software application 114(i), a column j for each unique technical facet $F_j$, and a value at the intersection (i.e., cell) of row i and column j indicating the number of times facet $F_j$ was found in the source code/binary of application 114(i). If facet $F_j$ was not found at all in software application 114(i), cell (i,j) can include a value of zero (or an empty/null value). By creating matrix X, computer system 100 can represent software applications 114(1)-(n) as points in a multi-dimensional space $\mathbb{E}^m$ where the m dimensions of $\mathbb{E}^m$ correspond to the unique technical facets $F_1, \ldots, F_m$ and where the specific location of each software application 114(i) within $\mathbb{E}^m$ reflects that application's reliance on the facets.

At step (4) (reference numeral 108), computer system 100 can provide matrix X as input to an ML-based dimensionality reduction algorithm in order to reduce the number of columns/dimensions in X from m to three. In this way, computer system 100 can effectively "remap" software applications 114(1)-(n) from m-dimensional space $\mathbb{E}^m$ into a less complex three-dimensional (3D) space $\mathbb{E}^3$ while preserving the salient relationships between the applications (or in other words, their relative distances from each other). The output of this dimensionality reduction algorithm is a new matrix X' of size n×3 with the three columns/dimensions of X' corresponding to the x, y, and z dimensions of 3D space $\mathbb{E}^3$.

Computer system 100 can then provide new matrix X' as input to an ML-based clustering algorithm, which can logically group software applications 114(1)-(n) into one or more clusters $C_1, \ldots, C_k$ based on their locations in 3D space $\mathbb{E}^3$, per the data in X' (step (5); reference numeral 110). For example, the clustering algorithm may group a first set of software applications that are located relatively close to each other in $\mathbb{E}^3$ into a first cluster $C_1$ and group a second set of software applications that are located relatively close to each other but relatively far from the first set into a second, different cluster $C_2$. Because dimensionally-reduced matrix X' preserves the relative distances/relationships between the software applications captured in original matrix X (which was created using technical facet counts), each cluster identified by the clustering algorithm at step (5) will, for the most part, contain technically similar/related software applications. In certain embodiments, computer system 100 can tune the hyperparameters used to control the operation of the dimensionality reduction algorithm and the clustering algorithm based on various factors (e.g., the nature/size of software portfolio 116, the desired number of clusters, etc.) in order to optimize the accuracy of the clustering process.

At step (6) (reference numeral 112), computer system 100 can generate one or more visualizations or reports that map software applications 114(1)-(n) to application categories in accordance with the clusters identified by the clustering algorithm at step (5). For example, if the clustering algorithm groups software applications 114(1), 114(2), and 114 (3) into a first cluster $C_1$ and groups software applications 114(4), 114(5), and 114(6) into a second cluster $C_2$, the visualization(s)/report(s) can present 114(1), 114(2), and 114(3) as comprising a first application category $CAT_1$ and present 114(4), 114(5), and 114(6) as comprising a second application category $CAT_2$. In a particular embodiment, the visualization(s)/report(s) can include a series of "heatmaps" that illustrate, for each application category, the most influential (i.e., most commonly appearing) technical facets in the category and the per-application facet counts for each of those most influential technical facets. These heatmaps are described in further detail in section (3) below.

Finally, although not shown in FIG. 1, the visualization(s)/report(s) generated at step (6) can be subsequently used to further assess or analyze software portfolio 116 as needed. For instance, in a scenario where software architects are tasked with manually reviewing software applications 114(1)-(n) as part of, e.g., a project for modernizing software portfolio 116, the software architects may leverage the visualization(s)/report(s) to carry out their review on a per-category, rather than per-application, basis, thereby significantly reducing the time and effort required. Alternatively, the visualization(s)/report(s) may be provided to software programs or automated agents that can ingest the application categories identified in the visualization(s)/report(s) to execute various downstream processing tasks.

It should be appreciated that FIG. 1 is illustrative and not intended to limit embodiments of the present disclosure. For example, although computer system 100 is shown as a singular entity in FIG. 1 for ease of illustration and explanation, in some embodiments computer system 100 may be a distributed system comprising multiple machines for increased performance, fault tolerance, and/or other reasons. One of ordinary skill in the art will recognize other variations, modifications, and alternatives.

3. Example Implementation

Figure 2:
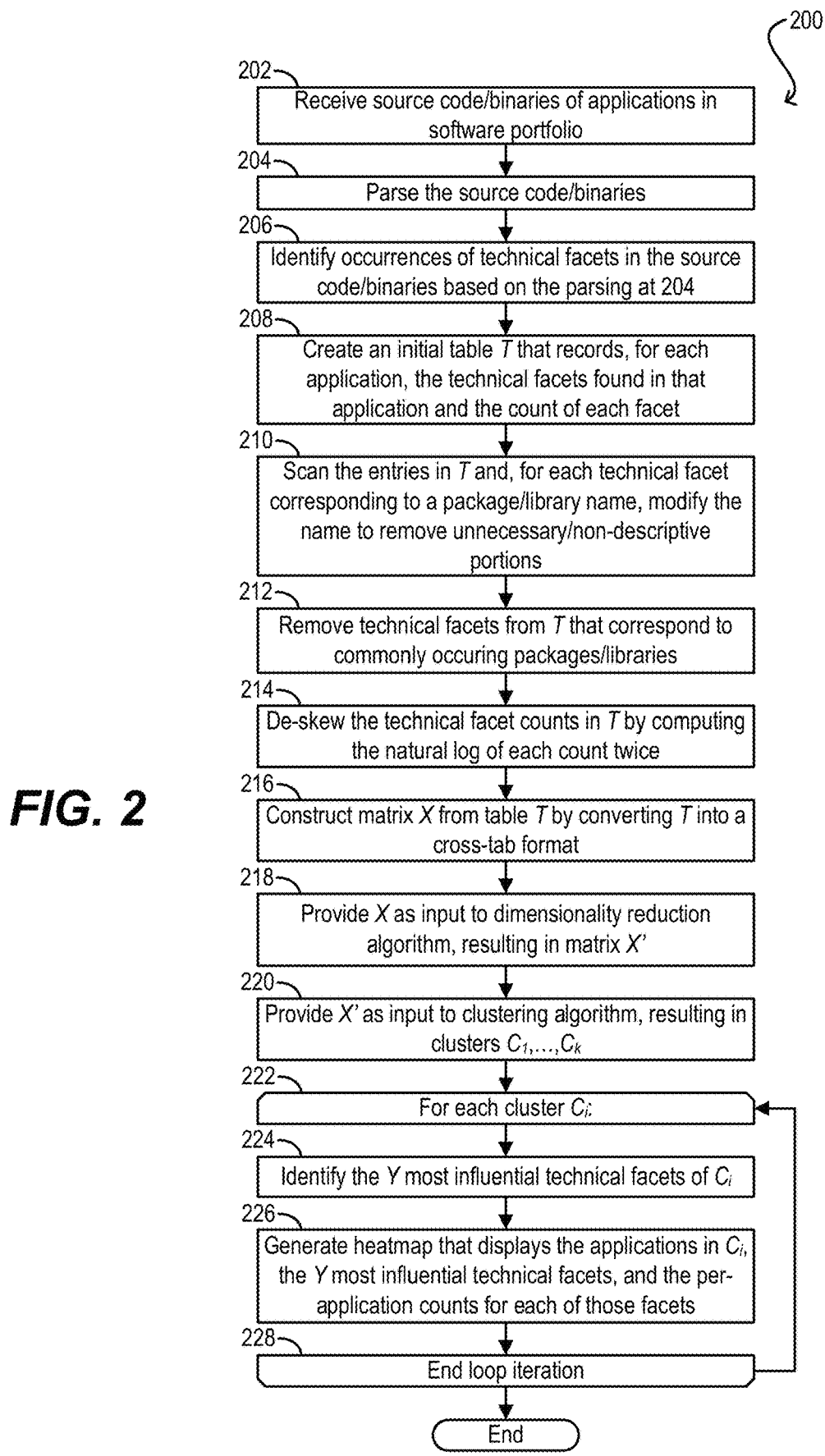
FIG. 2 depicts a flowchart of an implementation of the high-level workflow of FIG. 1 according to certain embodiments.

FIG. 2 is a flowchart 200 that details a particular implementation of the high-level workflow of FIG. 1 according to certain embodiments. This implementation includes, among other things, additional steps for pre-processing the technical facet data that is used to build matrix X and generating a specific type of visualization, referred to as a heatmap, at the conclusion of the process.

Starting with blocks 202-208 of flowchart 200, computer system 100 can receive the application source/code binaries of software applications 114(1)-(n), parse the received source code/binaries, identify occurrences of technical facets in the source code/binaries based on the parsing, and create an initial table (or file) T that records, for each software application 114(i), the technical facets found in application 114(i) and the count of each facet (i.e., the number of times that facet was encountered in the application). For instance, the following is an example representation of table T:

| Listing 1 | | |
|---|---|---|
| Application Name | Technical Facet Name | Count |
| Application-1 | Package-1 | 92 |
| Application-1 | Method-1 | 201 |
| Application-2 | Package-1 | 143 |
| Application-2 | Method-2 | 39 |
| Application-3 | Package-2 | 160 |
| Application-3 | Method-1 | 1110 |
| Application-3 | Annotation-1 | 125 |

At block 210, computer system 100 can scan the entries in table T and, for each technical facet corresponding to an imported package/library name, can modify the package/library name to remove any portions that are not part of the "base" name. Such portions may include domain names or company names that are common to all packages/libraries developed by a particular entity, and thus are considered non-descriptive with respect to the actual content of that specific package/library. For example, consider the package name "org.jboss.msc.service.ServiceName." In this case, the prefix "org" and the suffix "service.ServiceName" can be removed, resulting in the base name "boss.msc." In addition, at block 212, computer system 100 can delete any technical facets in table T that correspond to very commonly occurring packages/libraries. These steps can reduce the noise in the data of T and thereby lead to better clustering at the end of the process.

Upon completing the noise reduction at blocks 210 and 212, computer system 100 can de-skew the technical facet counts in table T by taking the natural log of each count twice (or in other words, computing the log-log of each count) (block 214). This results in a more normal (i.e., bell shaped) distribution of technical facet counts, which facilitates dimensionality reduction and clustering. For example, the following shows table T from Listing 1 above with this de-skewing applied:

Listing 2

| Application Name | Technical Facet Name | Count (De-skewed) |
|---|---|---|
| Application-1 | Package-1 | 0.239 |
| Application-1 | Method-1 | 0.362 |
| Application-2 | Package-1 | 0.334 |
| Application-2 | Method-2 | 0.202 |
| Application-3 | Package-2 | 0.343 |
| Application-3 | Method-1 | 0.484 |
| Application-3 | Annotation-1 | 0.322 |

Computer system 100 can then construct a matrix X from table T by converting it into a cross-tabular form, such that X includes n rows corresponding to software applications 114(1)-(n), m columns corresponding to the unique technical facets $F_1, \ldots, F_m$ found in applications 114(1)-(n), and a value at each intersecting cell (i,j) corresponding to the de-skewed count of facet $F_j$ for application $A_i$ (block 216). Listing 3 below illustrates this matrix using the data from table T of Listing 2:

Listing 3

| | Package-1 | Method-1 | Method-2 | Package-2 | Annotation-1 |
|---|---|---|---|---|---|
| Application-1 | 0.239 | 0.362 | 0 | 0 | 0 |
| Application-2 | 0.334 | 0 | 0.202 | 0 | 0 |
| Application-3 | 0 | 0.484 | 0 | 0.343 | 0.322 |

At block 218, computer system 100 can provide matrix X (without the row and column headers shown in Listing 3) as input to an ML-based dimensionality reduction algorithm, resulting in a new, dimensionally-reduced matrix X' of size n×3. Further, at block 220, computer system 100 can provide dimensionally-reduced matrix X' as input to an ML-based clustering algorithm, resulting in one or more clusters $C_1, \ldots, C_k$ that each includes a disjoint subset of the software applications in software portfolio 116. These blocks are substantially similar to steps (4) and (5) of the high-level workflow of FIG. 1. In one set of embodiments, the algorithms used at blocks 218 and 220 can be those implemented by the open-source UMAP and HDBScan libraries respectively. In these embodiments, computer system 100 can employ the following hyperparameters for dimensionality reduction: samples=[2, 6], n_neighbors=[2, 5, 7], and min_dists=[0, 0.001].

Upon obtaining clusters $C_1, \ldots, C_k$, computer system 100 can generate a set of heatmaps that visualize the software applications in each cluster/category and the most influential (i.e., most commonly occurring) technical facets in that cluster/category. In particular, at block 222 computer system 100 can enter a loop for each cluster $C_i$ for i=1, ..., k. Within this loop, computer system can identify the Y most influential technical facets for cluster $C_i$ by computing, for the applications in cluster $C_i$, per-column totals of the columns/technical facets in original matrix M and selecting the Y technical facets with the highest totals (block 224).

Figure 3:
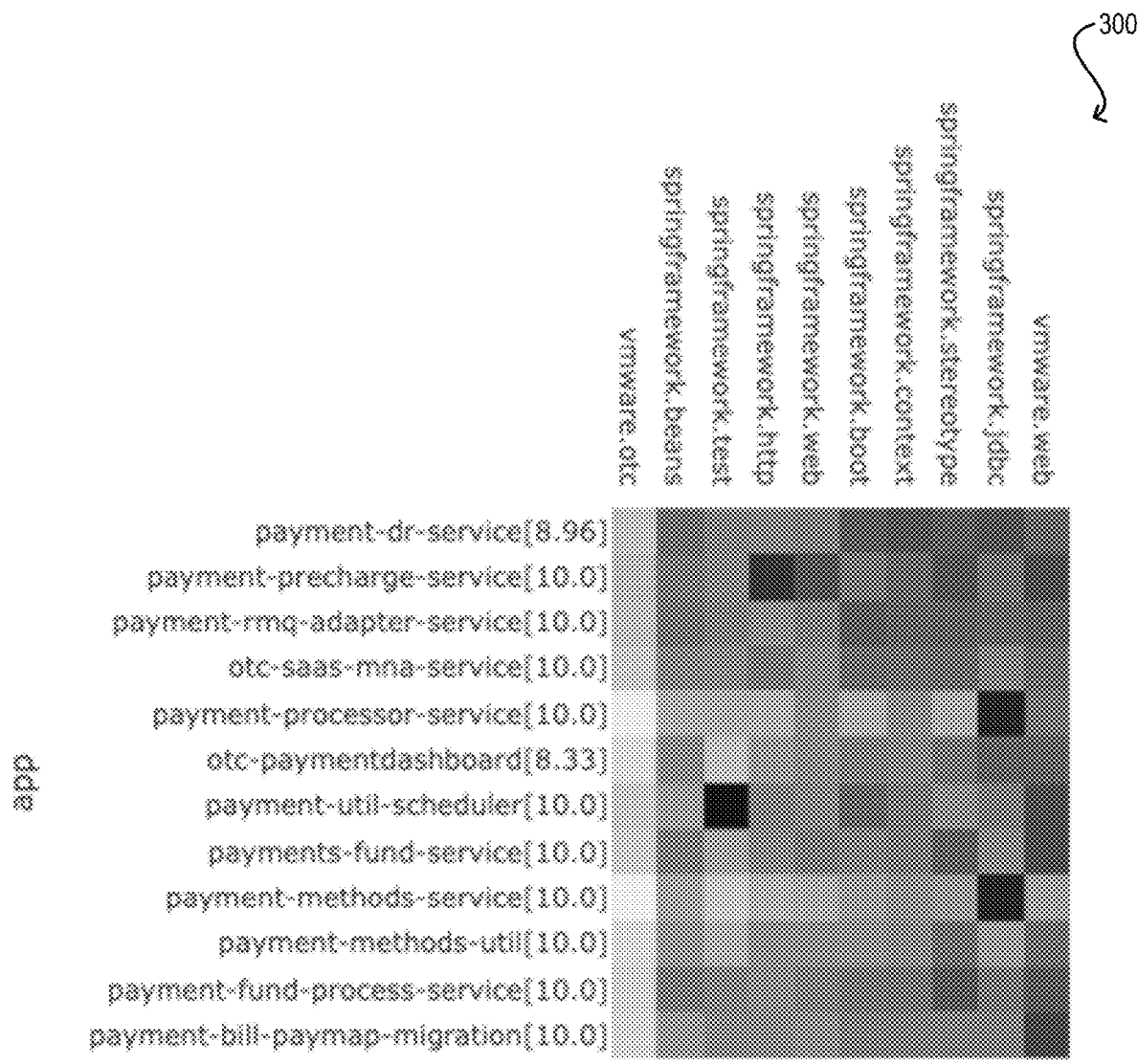
FIG. 3 depicts an example heatmap visualization according to certain embodiments.

Computer system 100 can then generate a heatmap for cluster $C_i$ that depicts the software applications in $C_i$, the Y most influential technical facets for cluster $C_i$ (as identified at block 224), and a color-based or shading-based representation of the facet count for each application/facet pair (block 226). An example of this heatmap is depicted via diagram 300 in FIG. 3. In this figure, the Y most influential technical facets of the cluster (shown as the columns of the heatmap) are ordered in terms of their degree of influence from left to right.

Finally, at block 228, computer system 100 can reach the end of the current loop iteration and repeat blocks 224 and 226 for any remaining clusters. Once all of the clusters have been processed, flowchart 200 can end.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by a computer system, source code or binaries for a plurality of software applications;
   parsing, by the computer system, the source code or binaries and, based on the parsing, extracting information regarding occurrences of a plurality of technical facets in the source code or binaries, a technical facet being a technical pattern or characteristic found in a software application;
   creating, by the computer system, a file based on the extracted information, the file comprising a plurality of entries that record counts of the occurrences;
   converting, by the computer system, contents of the file into a matrix that presents the plurality of entries in a cross-tabular format, the matrix including a row for each software application in the plurality of software applications, a column for each technical facet in the plurality of technical facets, and a value at an intersecting cell of each row and each column indicating a number of times the technical facet of said each column was found in the software application of said each row;
   processing, by the computer system, the matrix using a machine learning (ML)-based dimensionality reduction algorithm, the processing using the ML-based dimensionality reduction algorithm resulting in output of a dimensionally reduced matrix;
   processing, by the computer system, the dimensionally reduced matrix using a ML-based clustering algorithm, the processing using the ML-based clustering algorithm resulting in output of a set of clusters that each includes one or more of the plurality of software applications; and
   generating, by the computer system, one or more visualizations or reports that present the plurality of software applications in categories based on the set of clusters.

2. The method of claim 1 wherein the plurality of technical facets include packages or libraries imported by the plurality of software applications.

3. The method of claim 1 wherein the plurality of technical facets include methods or functions invoked by the plurality of software applications.

4. The method of claim 1 wherein the plurality of technical facets include annotations or tags present in the source code or binaries of the plurality of software applications.

5. The method of claim 1 further comprising, prior to converting the contents of the file into the matrix, modifying the plurality of entries by:
   disregarding occurrences of technical facets that correspond to commonly used packages or libraries; and
   modifying names of technical facets that correspond to packages or libraries to remove non-descriptive portions in the names.

6. The method of claim 1 further comprising, prior to converting the contents of the file into the matrix, modifying the plurality of entries by:
   de-skewing the counts by computing a natural log of each count twice.

7. The method of claim 1 wherein the one or more visualizations include a heatmap for each cluster that presents most commonly occurring technical facets in said each cluster and a per-application count of each of the most commonly occurring technical facets.

8. A non-transitory computer readable storage medium having stored thereon program code executable by a computer system, the program code embodying a method comprising:
   receiving source code or binaries for a plurality of software applications;
   parsing the source code or binaries and, based on the parsing, extracting information regarding occurrences of a plurality of technical facets in the source code or binaries, a technical facet being a technical pattern or characteristic found in a software application;
   creating a file based on the extracted information, the file comprising a plurality of entries that record counts of the occurrences;
   converting contents of the file into a matrix that presents the plurality of entries in a cross-tabular format, the matrix including a row for each software application in the plurality of software applications, a column for each technical facet in the plurality of technical facets, and a value at an intersecting cell of each row and each column indicating a number of times the technical facet of said each column was found in the software application of said each row;
   processing the matrix using a machine learning (ML)-based dimensionality reduction algorithm, the processing using the ML-based dimensionality reduction algorithm resulting in output of a dimensionally reduced matrix;
   processing the dimensionally reduced matrix using a ML-based clustering algorithm, the processing using the ML-based clustering algorithm resulting in output of a set of clusters that each includes one or more of the plurality of software applications; and
   generating one or more visualizations or reports that present the plurality of software applications in categories based on the set of clusters.

9. The non-transitory computer readable storage medium of claim 8 wherein the plurality of technical facets include packages or libraries imported by the plurality of software applications.

10. The non-transitory computer readable storage medium of claim 8 wherein the plurality of technical facets include methods or functions invoked by the plurality of software applications.

11. The non-transitory computer readable storage medium of claim 8 wherein the plurality of technical facets include annotations or tags present in the source code or binaries of the plurality of software applications.

12. The non-transitory computer readable storage medium of claim 8 wherein the method further comprises, prior to converting the contents of the file into the matrix, modifying the plurality of entries by:
   disregarding occurrences of technical facets that correspond to commonly used packages or libraries; and
   modifying names of technical facets that correspond to packages or libraries to remove non-descriptive portions in the names.

13. The non-transitory computer readable storage medium of claim 8 wherein the method further comprises, prior to converting the contents of the file into the matrix, modifying the plurality of entries by:
de-skewing the counts by computing a natural log of each count twice.

14. The non-transitory computer readable storage medium of claim 8 wherein the one or more visualizations include a heatmap for each cluster that presents most commonly occurring technical facets in said each cluster and a per-application count of each of the most commonly occurring technical facets.

15. A computer system comprising:
a processor; and
a non-transitory computer readable medium having stored thereon program code that, when executed, causes the processor to:
receive source code or binaries for a plurality of software applications;
parse the source code or binaries and, based on the parsing, extract information regarding occurrences of a plurality of technical facets in the source code or binaries, a technical facet being a technical pattern or characteristic found in a software application;
create a file based on the extracted information, the file comprising a plurality of entries that record counts of the occurrences;
convert contents of the file into a matrix that presents the plurality of entries in a cross-tabular format, the matrix including a row for each software application in the plurality of software applications, a column for each technical facet in the plurality of technical facets, and a value at an intersecting cell of each row and each column indicating a number of times the technical facet of said each column was found in the software application of said each row;
process the matrix using a machine learning (ML)-based dimensionality reduction algorithm, the processing using the ML-based dimensionality reduction algorithm resulting in output of a dimensionally reduced matrix;
process the dimensionally reduced matrix using a ML-based clustering algorithm, the processing using the ML-based clustering algorithm resulting in output of a set of clusters that each includes one or more of the plurality of software applications; and
generate one or more visualizations or reports that present the plurality of software applications in categories based on the set of clusters.

16. The computer system of claim 15 wherein the plurality of technical facets include packages or libraries imported by the plurality of software applications.

17. The computer system of claim 15 wherein the plurality of technical facets include methods or functions invoked by the plurality of software applications.

18. The computer system of claim 15 wherein the plurality of technical facets include annotations or tags present in the source code or binaries of the plurality of software applications.

19. The computer system of claim 15 wherein the program code further causes the processor to, prior to converting the contents of the file into the matrix, modifying the plurality of entries by:
disregard occurrences of technical facets that correspond to commonly used packages or libraries; and
modify names of technical facets that correspond to packages or libraries to remove non-descriptive portions in the names.

20. The computer system of claim 15 wherein the program code further causes the processor to, prior to converting the contents of the file into the matrix, modifying the plurality of entries by:
de-skew the counts by computing a natural log of each count twice.

21. The computer system of claim 15 wherein the one or more visualizations include a heatmap for each cluster that presents most commonly occurring technical facets in said each cluster and a per-application count of each of the most commonly occurring technical facets.

* * * * *